United States Patent [19]

Ousey

[11] 3,743,795

[45] July 3, 1973

[54] ELECTRIC POWER SUPPLY SYSTEMS

[75] Inventor: David George Ousey, Cambridge, England

[73] Assignee: Tracked Hovercraft Limited, London, England

[22] Filed: Sept. 7, 1971

[21] Appl. No.: 178,202

[52] U.S. Cl. .......... 191/2, 307/17
[51] Int. Cl. .......... B60m 1/00
[58] Field of Search .......... 191/6, 14, 2; 307/83, 69, 17; 317/26

[56] References Cited

UNITED STATES PATENTS

| | | | |
|---|---|---|---|
| 461,851 | 10/1891 | Short | 191/6 |
| 1,842,392 | 1/1932 | Dowling | 307/83 |

FOREIGN PATENTS OR APPLICATIONS

| | | | |
|---|---|---|---|
| 27,197 | 12/1905 | Great Britain | 191/2 |

*Primary Examiner*—Gerald M. Forlenza
*Assistant Examiner*—George H. Libman
*Attorney*—G. W. Daisley

[57] ABSTRACT

An electric power supply system for supplying a.c. electric power to a vehicle such as a gas cushion vehicle travelling along a prepared track, via a conductor rail extending along the track and co-operating pick-up devices on the vehicle. The conductor rail is divided into a plurality of sections by discontinuities between sections, and at each discontinuity there is provided a transformer having two secondary windings which are separately connected to the adjacent ends of the sections of conductor rail and each of which has a high per unit impedance of preferably greater than 10 percent. The primary windings of the transformers are connected to a.c. supplies substantially in phase with one another.

2 Claims, 2 Drawing Figures

Patented July 3, 1973 3,743,795

ELECTRIC POWER SUPPLY SYSTEMS

This invention relates to electric power supply systems for ground transportation systems for providing an a.c. electric power supply for a vehicle travelling along a prepared track.

According to the present invention an electric power supply system for providing an a.c. electric power supply for a vehicle travelling along a track in a ground transportation system comprises a length of conductor rail extending along the track for co-operation with electrical pick-up devices on the vehicle and divided along its length into a plurality of sections by discontinuities between sections, and a transformer for each discontinuity, the transformers each having two secondary windings separately connected to the adjacent ends of the respective sections of conductor rail and having their primary members connected to a.c. supplies which are substantially in phase with one another.

Advantageously the transformers have high per unit impedances preferably of greater than 10 percent.

"Conductor rail" is used above and throughout the specification in a collective sense, so that each section of "conductor rail" comprises a plurality of separate conductor members spaced transversely apart for energisation from the one or more phases of the a.c. outputs of the transformers.

If the transportation system is extensive (e.g., 100 miles or more in extent) it may not be possible satisfactorily to ensure a sufficiently close phase angle relationship of the inputs to the transformers with only one length of conductor rail provided for the whole system. Large circulating currents would then flow in the conductor rail and transformer windings, leading to inefficient operation and reduced capability to supply power to the vehicle.

According to a feature of the present invention, the conductor rail comprises a plurality of the said lengths isolated from one another by insulating sections therebetween.

In order that the invention may be more fully understood, two supply systems in accordance with the invention will now be described, by way of example, with reference to the accompanying drawings, in which.

Figure 1:
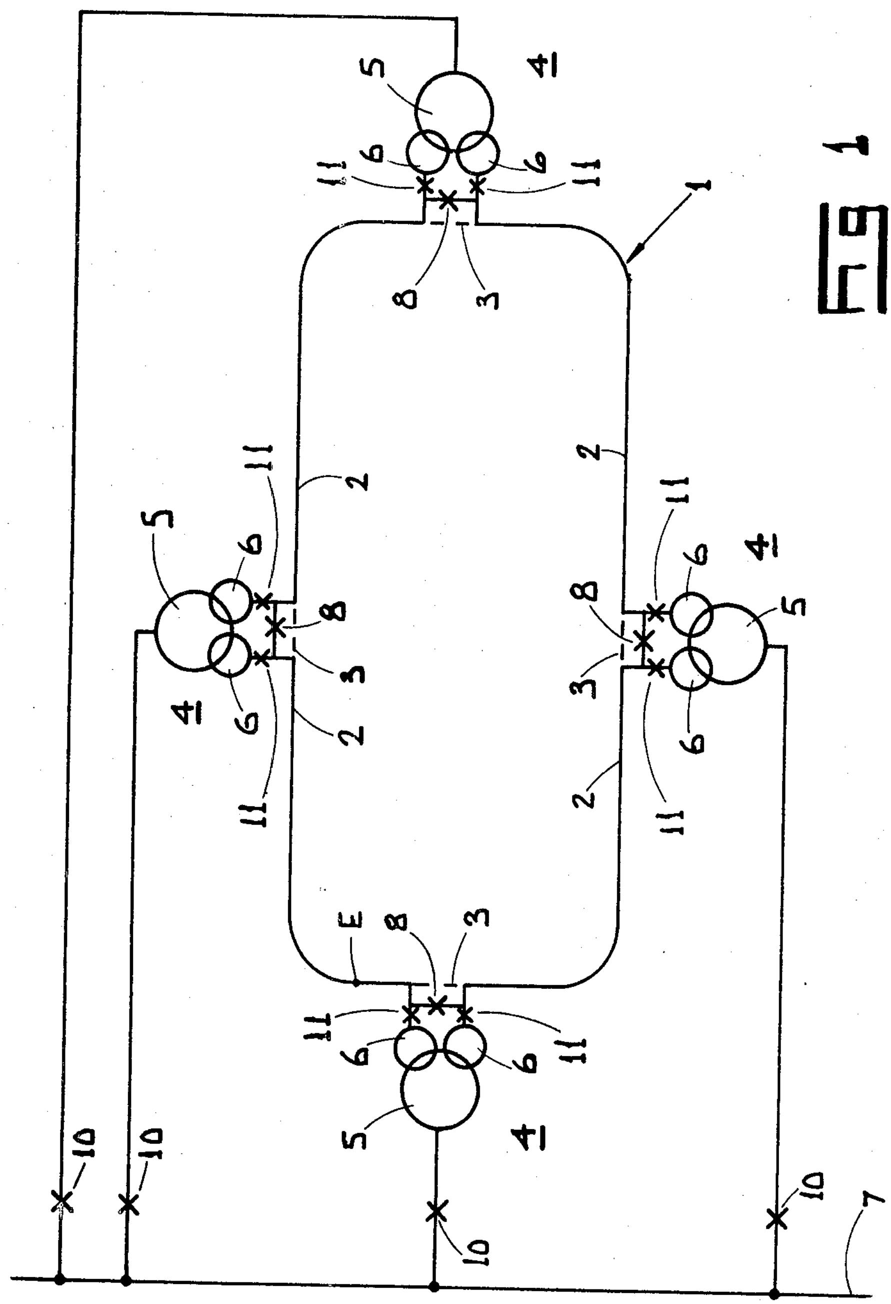
FIG. 1 is a circuit diagram showing the first supply system.

Although not indicated in the drawings, each supply system is to be understood to form part of a high speed ground transportation system in which a gas cushion vehicle is propelled along a prepared track by means of a three-phase linear induction motor of which the primary member is carried by the vehicle and the secondary member extends along the track. The supply sytem is provided for supplying the linear induction motor primary member with three-phase electric power as the vehicle travel along the track.

Referring now to FIG. 1, the prepared track of the ground transportation system of the first embodiment is in the form of a closed loop, and the conductor rail of the supply system, indicated by the reference numeral 1, is correspondingly of that form.

The conductor rail is generally formed of three separate conductor members which are spaced apart transversely of the conductor rail and may be arranged in any desired transverse configuration.

The conductor rail is divided into sections 2 by discontinuities 3 each associated with a respective three-phase transformer 4 and bridgable by a circuit breaker 8. The primary windings 5 of the transformers 4 are connected via respective circuit breakers 10 for supply in parallel from a three-phase power line 7. Each transformer 4 has two secondary windings 6, and for each transformer the seondary windings are separately connected via two further circuit breakers 11 to the two section ends of the conductor rail at the respective discontinuity.

It will therefore be seen that each section 2 of the conductor rail is connected at its ends to the outputs of two transformers 4. It will be appreciated in this respect that the conductor members forming each section of conductor rail are connected to respective phases of the transformer outputs, and that each conductor member of a section is fed from the same phases of the two transformers by which it is supplied.

In operation the system supplies three-phase power to the vehicle operating along the track, via pick-up shoes or equivalent devices which co-operate with the conductor rail 1 as the vehicle passes successively along the sections 2. The power thus transferred to the vehicle is supplied to the linear induction motor primary member on the vehicle to drive the vehicle along the track. The power may additionally be used for driving devices other than the linear induction motor.

The circuit arrangement shown and described has advantage over circuit arrangements in which each section of conductor rail is individually fed from the secondary winding of a respective transformer.

Assuming that there is never more than one vehicle in adjacent sections of conductor rail, in normal operation each transformer 4 is only required, at the maximum, to supply approximately half of the power required by a vehicle. This is because it shares the electrical load of a vehicle approximately equally with the appropriate one of the two adjacent transformers when the vehicle is in one of its associated sections 2.

The relatively low power handling capacity required of it enables each transformer easily to be wound so as to have a per unit impedance which is substantially greater than would otherwise be the case had the transformer had to handle the whole vehicle load. Preferably each transformer has a per unit impedance greater than 10 percent (when one secondary member is open-circuited).

For normal operation the substantial per unit impedance of each transformer 4 does not result in an unduly large voltage regulation at the vehicle because of the parallel connection of the secondary windings 6 to the conductor rail sections. Thus normal operation is substantially unaffected by the high transformer impedances.

Under fault conditions of operation, however, the relaively high impedances of the transformers 4 will have a beneficial effect, as will become apparent from the following example. Assuming, for example that a phase-to-earth or phase-to-phase fault develops in the conductor rail at the point E in FIG. 1, the two transformers 4 at the ends of the affected section 2 will for a time feed increasing power into the fault. Eventually the transformer which is nearest to the fault — the left-hand transformer as shown — will reach a predetermined condition at which operates the associated fault protection system (not shown) which will conventionally be provided. The fault protection system in turn operates the associated circuit breaker 10 to interrupt the supply to the transformer from the supply line 7. The relatively high per unit impedance of the transformer 4 limits the rate of current build-up and prospective current so that the performance required of the circuit breaker 10 is reduced.

The other transformer connected to the affected section 2 thereafter continues to feed current to the fault until its own fault protection system operates. Again, the relatively high per unit impedance of the transformer reduces the performance required of the associated circuit breaker 10.

Should a fault develop at any time in one of the transformers 4 (or at its supply from the line 7), the associated circuit breakers 8, 10 and 11 are operated to isolate it from the system and to connect directly together the two conductor rail sections which it normally feeds. The transportation system as a whole can then operate at reduced power with a number of conductor rail sections which is one less than usual.

The inductive coupling provided by each transformer 4 between its secondary windings allows power to be tranmitted between the conductor rail sections to which it is connected. Thus a vehicle in one section will receive some of its power from transformers other than the two associated with that particular section.

The power transmitted along the conductor rail in this way will, of course, be considerably limited by the impedances of the one or more transformers through which it passes and, to a lesser extent, by the impedance of the conductor rail itself. To some extent, however, it will distribute the vehicle load between the transformers and so will tend to reduce the rating required of the transformers.

The supply system shown in FIG. 1 is associated with a relatively small scale transportation system so that the farthest distance between transformers 4 is, say, 50 miles. For such a small scale system sufficiently close phase angle relationships between the inputs to the transformers 4 can be achieved without undue difficulty.

For larger scale systems, however, difficulties may arise with regard to the phase angle relationships of the transformer 4 inputs, even though all the transformers may be fed from the same power line or utility. (Substantial phase angles will, of course, result in large circulating currents in the conductor rail and the transformer windings, with reduced efficiency and reduced capability to supply power to the vehicle.)

In order to reduce the difficulties of providing sufficiently close phase angle relationships, insulating sections may be provided at suitable intervals along the conductor rail. Between successive insulating sections the conductor rail is divided (as above) into live sections by discontinuities each associated with a double-secondary transformer. The transformers associated with each length of conductor rail between insulating sections have inputs which are in phase with one another but which may be out of phase with, or even at a different frequency from, the inputs to the transformers for the remainder of the conductor rail.

Figure 2:
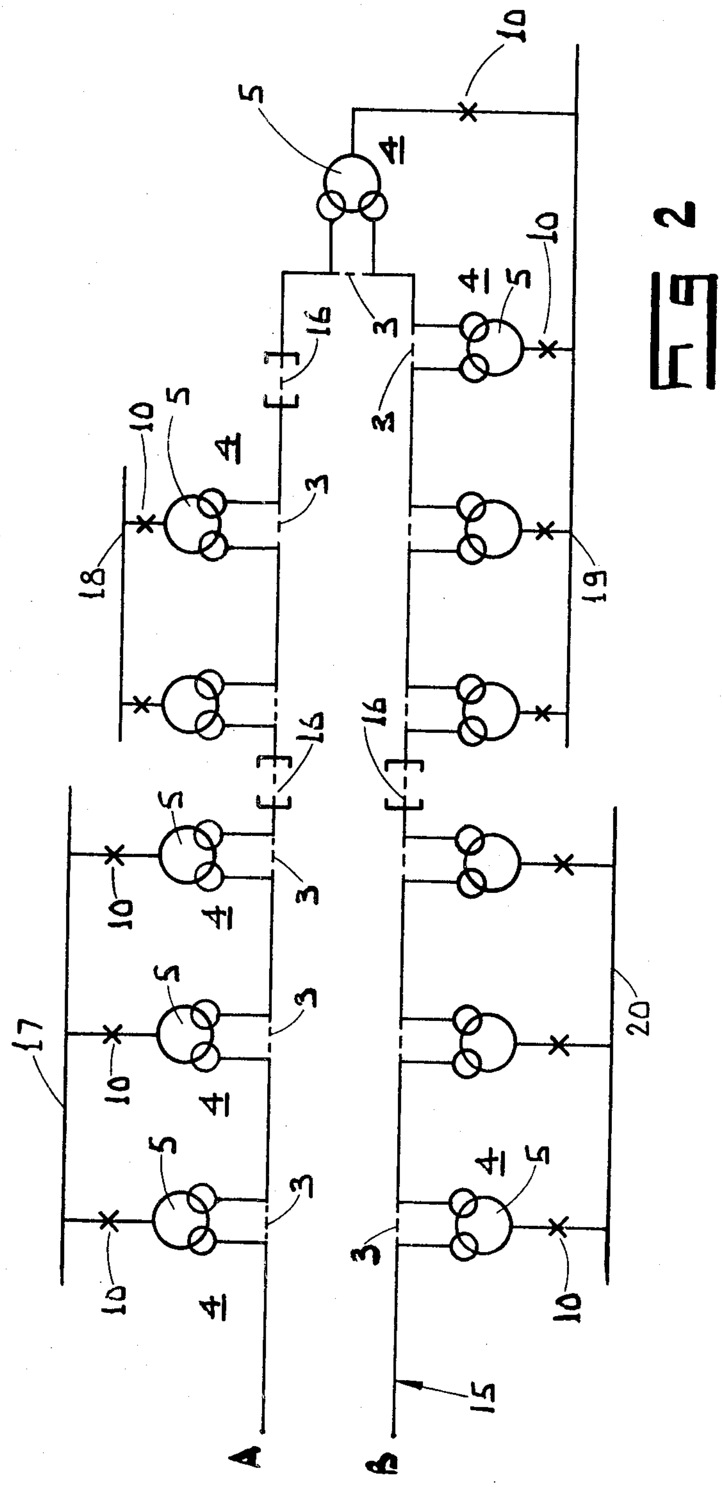
FIG. 2 is a simplified circuit diagram showing the second supply system.

This is illustrated in FIG. 2 which shows the second embodiment of the invention to be applied to a ground transportation system of the open-ended kind, having its prepared track extending more or less directly — although not shown as such — between two points A, B which are typically many hundreds of miles apart. In FIG. 2 the reference numerals of FIG. 1 are used wherever appropriate to indicate like parts.

In FIG. 2 the three-phase conductor rail as a whole is indicated by the reference numeral 15 and the unsulating sections, typically a few feet in length, by the reference numeral 16. The lengths of conductor rail between the insulating sections 16 have the primary windings of their associated transformers 4 fed in common from essentially independent supply lines denoted respectively by the reference numerals 17, 18, 19 and 20.

Circuit breakers corresponding to those numbered 8 and 11 in FIG. 1 are provided in the system of FIG. 2 for each transformer 4, but in FIG. 2 these are omitted for clarity.

The invention is applicable to ground transportation systems in which co-operation between vehicle and conductor rail can either be of the contacting or non-contacting kind. In systems using a contacting kind of power transfer short lengths of insulating rail may be needed at the insulating sections 16 and the discontinuities 3 for providing mechanical continuity between the adjacent ends of the conductor rail sections. In non-contacting systems the sections 16 and discontinuities 3 may be merely air gaps.

I claim:

1. An electric power supply sytem for providing an a.c. electric power supply for a vehicle travelling along a prepared track in a ground transportation system, comprising a legth of conductor rail extending along the track for co-operation with electrical pick-up devices on the vehicle and divided along its length into a plurality of sections by discontinuities between sections, and a transformer for each discontinuity, the transformers each having two secondary windings separately connected to the adjacent ends of the respective sections of conductor rail and having their primary members connected to a.c. supplies which are substantially in phase with one another.

2. An electric power supply system as claimed in claim 1, wherein the conductor rail comprises a plurality of the said sections isolated from one another by insulating sections therebetween.

* * * * *

UNITED STATES PATENT OFFICE

CERTIFICATE OF CORRECTION

Patent No. 3,743,795 Dated July 3, 1973

Inventor(s) David George Ousey

It is certified that error appears in the above-identified patent and that said Letters Patent are hereby corrected as shown below:

On the cover sheet, after item [21], insert

-- [30] Foreign Application Priority Data

September 8, 1970 Great Britain 42977/70 --.

Column 4, line 42, "legth" should read -- length --.

Signed and sealed this 20th day of November 1973.

(SEAL)
Attest:

EDWARD M.FLETCHER,JR.
Attesting Officer

RENE D. TEGTMEYER
Acting Commissioner of Patents